United States Patent [19]

Dieckman

[11] Patent Number: 5,058,471

[45] Date of Patent: Oct. 22, 1991

[54] ROD SHEARING MACHINE

[76] Inventor: John W. Dieckman, 3120 8½ St., Monroe, Wis. 53562

[21] Appl. No.: 564,648

[22] Filed: Aug. 9, 1990

[51] Int. Cl.⁵ .............................................. B23D 17/06
[52] U.S. Cl. ....................................... 83/200; 83/599; 83/694; 83/955; 30/253
[58] Field of Search ................. 30/253, 283, 278, 289, 30/92; 83/196, 199, 200, 605, 599, 694, 955

[56] References Cited

U.S. PATENT DOCUMENTS

| | | | |
|---|---|---|---|
| 146,846 | 1/1874 | Stevens | 83/200 |
| 4,592,715 | 6/1986 | Nebelung | 83/199 X |

Primary Examiner—Douglas D. Watts
Assistant Examiner—Clark F. Dexter
Attorney, Agent, or Firm—Keith Schoff

[57] ABSTRACT

A scissors action shearing machine for sectioning reinforcing rod is equipped with replaceable, hardened steel shear blocks affixed to each scissors mounting blade with each such block and blade pierced to provide a communicating aperture through the entire structure for enabling reinforcing rod to be inserted therethrough whereupon one blade with affixed shear block is rotatively biased with respect to the other to section the rod.

4 Claims, 1 Drawing Sheet

ROD SHEARING MACHINE

FIELD OF ART

Reinforced concrete construction utilized soft steel reinforcing rods which require cutting to length prior to use.

BACKGROUND OF INVENTION

Reinforcing rod may be cut by use of a manual or powered hack saw, abrasive cutting wheels, or shearing machines. When a scissors type shearing machine is used, it may be required to provide means for maintaining a rod in position to prevent it from sliding along the edges of the scissors blades during shearing.

SUMMARY OF THE INVENTION

A scissors-action shearing machine is provided with apertures which communicate through the pivotally connected blade and plate support members of the machine so that a reinforcing rod to be sheared can be inserted through the aligned apertures, and through apertures in hardened steel shear blocks fixedly attached to the pivotally connected stationary blade and rotatable plate support members on which they are mounted, and be firmly maintained in position while the movable plate and attached shear block are operably rotated relative to the stationary blade and attached shear block to shear the rod. The apertures, which open through opposite faces of the shear blocks, may be arrayed symmetrically with respect to a center line of the face, so that the blocks can be reversed in position either by reversal of position of the two symmetrical half-faces of a block, or by interchanging the position of the two facing sides of a block, for a total of at least four repositioning before a shear block is retired from use. If a shear block comprises more than one pair of symmetrical positions on each face, then a correspondingly greater number of repositionings can be utilized.

DESCRIPTION OF THE INVENTION

Figure 1:
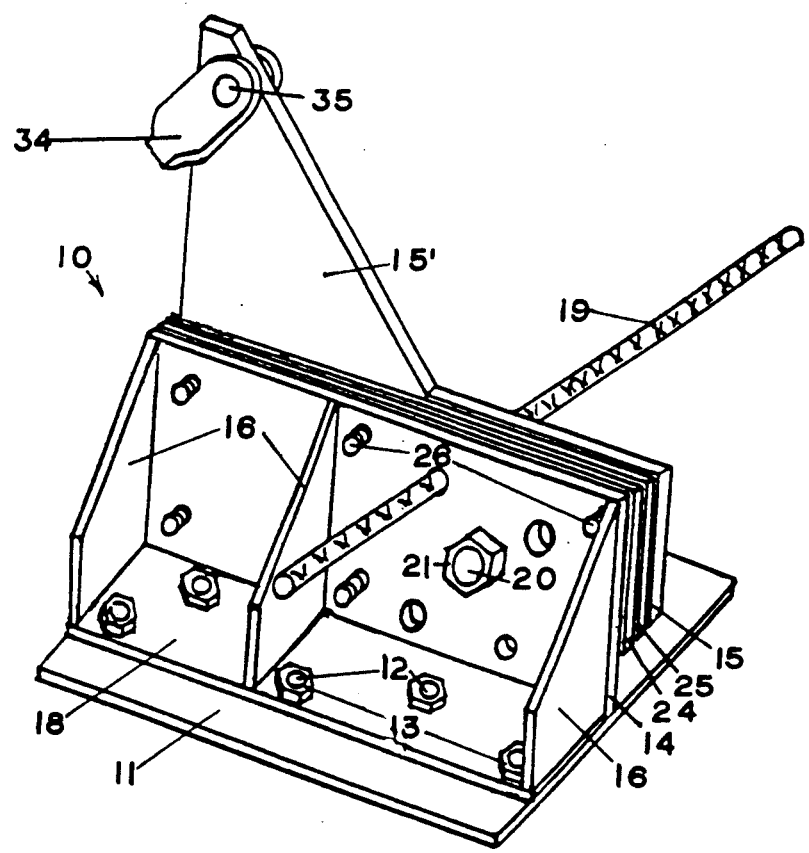
FIG. 1 is a perspective view of one embodiment of a shearing machine of this invention, and is shown mounted on a base plate and with a reinforcing rod inserted for being sectioned.

In FIG. 1 shearing machine 10 is shown mounted on base plate 11 by means of bolts 12 and nuts 13. Ribs 16 are welded to foot plate 18 and blade 14 providing an integral stationary mounting assembly for machine 10. Pivot pin 20 is received in aligned openings 28 and 17 (FIG. 2) and is secured by nut 21. Shear block 24 is removably mounted on blade 14 by screws 26 which are received in threaded openings 23 (FIG. 2), or alternatively, retention may be made by nuts, not shown. Reinforcing rod 19 is shown inserted in machine 10 in position to be operably sectioned.

Figure 2:
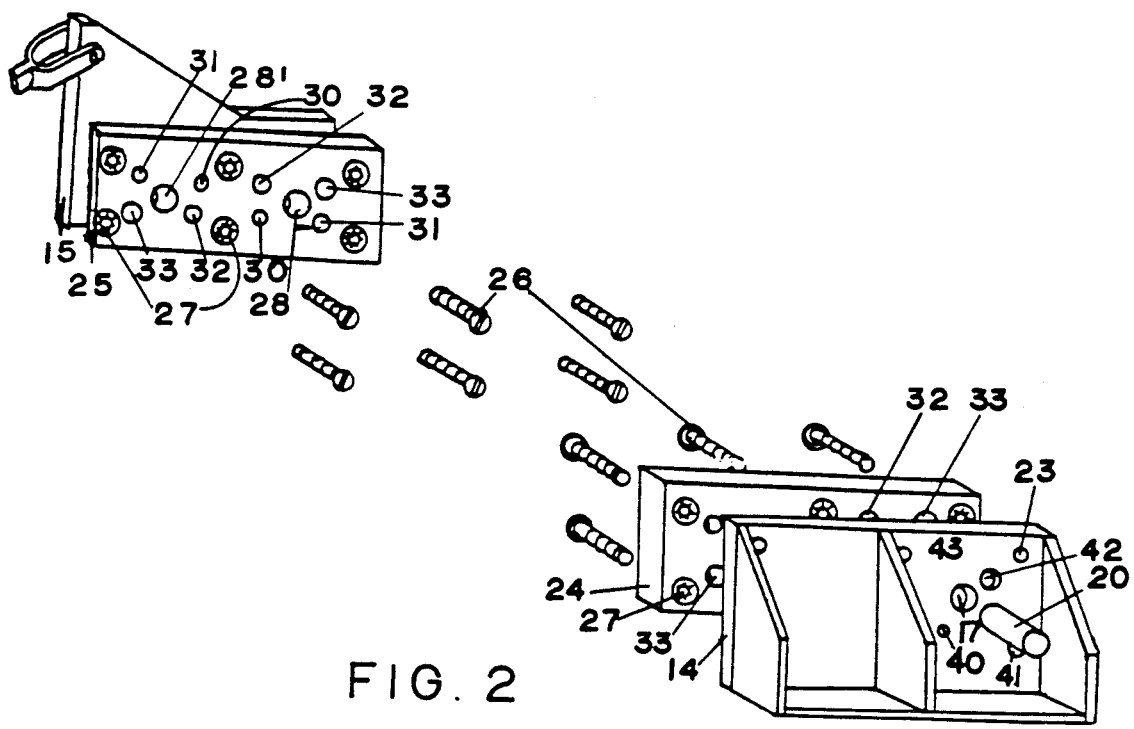
FIG. 2 is an exploded perspective view of the embodiment of the machine of FIG. 1, but with base plate and reinforcing rod deleted.

As best shown in FIG. 2, shear blocks 24 and 25 are identically configured with openings 27, for receiving screws 26, chamfered to enable the screw heads to lie flush with the face of the shear blocks. Alternatively, the openings may be countersunk if a fastener head of different configuration is used.

In addition to openings 27, shear blocks 24 and 25 each comprise openings 28 for receiving pivot pin 20, and similarly, opening 17 is provided in blade 14 and a corresponding opening is provided in plate 15 for receiving the pivot pin in operable manner. Arrays of different diameter openings are provided in alignment in views shown in FIGS. 1 and 2 in both blade 14 and plate 15 and shear blocks 24 and 25. Thus, openings 40, 41, 42, and 43 in both blade 14 and plate 15, (the openings in the latter being concealed from view) are aligned with openings 30, 31, 32, and 33 in shear blocks 24 and 25, to provide for receiving different diameters of reinforcing rod in close fit so that the rods will be firmly maintained in position during sectioning to prevent tearing and distortion at the sheared ends of the rods.

As shown, shear blocks 24 and 25 have patterns of openings and apertures symmetrically arranged with respect to each face in a manner which allows reversal in position of a shear block on its associated blade or plate support member end-for end, with the same face remaining exposed, in the case of the arrangement illustrated without alteration in the disposition and alignment of the various openings and apertures with the counterpart openings and apertures in the mounting blade 14 and plate 14, and which further enables shear blocks 24 and 25 to be interchanged between blade 14 and plate 15 so as to provide the formerly concealed faces as the new exposed faces, with unused shearing edges newly exposed also, again without disturbing the alignment with blade 14 and plate 15 of the several openings and apertures. It is apparent that a greater number of paired portions of the shear block faces, e.g. four, six or even more, can be provided to increase the number of repositionings possible for a shear block before wear and dulling of the shearing edges makes it necessary for it to be removed from service.

Plate 15 is disposed with its lower extremity elevated above that of blade 14 so that it may be rotated operably about pivot pin 20 for shearing a workpiece such as reinforcing rod 19. The upper extremity portion 15' of plate 15 provides a lever arm attachment site for yoke 34 through means of pin 35. Yoke 34 is attached to a piston rod of a double acting hydraulic cylinder, neither of which is shown, which provides the driving actuation to rotate plate 15 and attached shear block 25 about pivot pin 20.

If desired, tubular collars may be welded to blade 14 or to plate 15, or to both, to cylindrically extend openings 30, 31, 32, 33, and 40, 41, 42, 43, for better maintaining in position and stablizing a workpiece during sectioning, but such means are not shown. It is also apparent that the shear block, or mounting blade or plate of machine 10 may be circular in configuration, or hexagonal, octagonal or of other geometry as desired. It is only essential that the hole pattern in a shear block be such that rotation of the block of an exposed cutting face be such that a newly positioned opening or array of openings correspond with the pattern of the former opening or array.

I claim:

1. A machine for shearing steel reinforcing rods comprising
    a) a stationary shear block mounting blade configured with a pattern of apertures extending therethrough,
    b) a pivotally rotatable shear block mounting plate configured with a pattern of apertures extending therethrough identical to that of said mounting blade, c) two shear blocks each comprising a pattern of apertures extending therethrough identical to those of said mounting blade and said mounting plate, wherein each said shear block is configured to be mounted on one of said mounting blade and said mounting plate with the apertures in said pattern of apertures aligned between said shear block and one of said mounting blade and mounting plate, d) a pivot interconnecting said stationary mounting blade and said rotatable mounting plate disposed to enable said rotatable mounting plate to be operably rotatively driven relative to said stationary mounting blade, wherein said pattern of apertures in each said mounting plate, said shear blocks and said mounting blade are aligned when said mounting plate is in an unrotated position to enable a reinforcing rod to be inserted through said mounting blade, said shear blocks and said mounting plate, the shear blocks affixed to said mounting blade and to said mounting plate being disposed in near-contacting facing adjacency for causing said reinforcing rod to be sectioned therebetween by operable actuation of a means for rotatively driving said movable mounting plate and said shear block affixed thereto.

2. The machine of claim 1 wherein said shear blocks are each configured with at least one face through which said apertures communicate which is configured symmetrically one half to the other half thereof.

3. The machine of claim 1 wherein said shear blocks comprise hardened steel.

4. The machine of claim 1 wherein certain of said apertures which comprise mounting holes are configured with enlarged recessed portions for enabling threaded fastening means mounting said shear blocks on said mounting blade and said mounting plate to be operably disposed flush with the face of said shear blocks.

* * * * *